United States Patent [19]

Tanaka et al.

[11] Patent Number: 5,086,498

[45] Date of Patent: Feb. 4, 1992

[54] PARALLEL COMPUTER WITH ASYNCHRONOUS COMMUNICATION FACILITY

[75] Inventors: Teruo Tanaka, Hachioji; Naoki Hamanaka; Junji Nakagoshi, both of Tokyo; Koichiro Omoda, Sagamihara; Shigeo Nagashima, Hachioji, all of Japan

[73] Assignee: Hitachi, Ltd., Tokyo, Japan

[21] Appl. No.: 145,614

[22] Filed: Jan. 10, 1988

[30] Foreign Application Priority Data

Jan. 23, 1987 [JP] Japan .................................. 62-12358
Jan. 23, 1987 [JP] Japan .................................. 62-12359

[51] Int. Cl.⁵ .......................................... G06F 13/00
[52] U.S. Cl. ................................... 395/200; 364/940; 364/931.4; 364/228; 364/228.3; 364/284; 364/260
[58] Field of Search ... 364/200 MS File, 900 MS File

[56] References Cited

U.S. PATENT DOCUMENTS

| | | | |
|---|---|---|---|
| 4,064,553 | 12/1977 | Kashio . | |
| 4,110,822 | 8/1978 | Porter et al. . | |
| 4,128,880 | 12/1978 | Cray, Jr. | 364/200 |
| 4,128,882 | 12/1978 | Dennis | 364/200 |
| 4,408,273 | 10/1983 | Plow . | |
| 4,481,571 | 11/1984 | Pilat et al. . | |
| 4,601,586 | 7/1986 | Bahr et al. . | |
| 4,604,709 | 8/1986 | Blount et al. | 364/900 |
| 4,649,473 | 3/1987 | Hammer et al. | 364/200 |
| 4,713,758 | 12/1987 | De Kelaita et al. | 364/200 |
| 4,780,810 | 10/1988 | Torii et al. | 364/200 |

FOREIGN PATENT DOCUMENTS 60-49464 3/1985 Japan .

Primary Examiner—Stuart N. Hecker
Assistant Examiner—Rebecca L. Rudolph
Attorney, Agent, or Firm—Fay, Sharpe, Beall, Fagan, Minnich & McKee

[57] ABSTRACT

In a multiprocessor digital computer system ID data, coupled with data for which inter-processor communication is desired, is communicated from one processor and held temporarily with data in a receiver buffer (associative memory) in a receiving processor. This ID is divided into main ID data MK and sub ID data SK. Main ID data MK is used for searching data from a receive buffer. The sub ID data SK are used as an ID of the data in the receive processor.

20 Claims, 10 Drawing Sheets

FIG. 10
| $D_{11}$ | $D_{12}$ | $D_{13}$ | $D_{14}$ | $D_{15}$ | $D_{16}$ | $D_{17}$ | $D_{18}$ |
|---|---|---|---|---|---|---|---|
| $D_{21}$ | $D_{22}$ | $D_{23}$ | $D_{24}$ | $D_{25}$ | $D_{26}$ | $D_{27}$ | $D_{28}$ |
| $D_{31}$ | $D_{32}$ | $D_{33}$ | $D_{34}$ | $D_{35}$ | $D_{36}$ | $D_{37}$ | $D_{38}$ |
| $D_{41}$ | $D_{42}$ | $D_{43}$ | $D_{44}$ | $D_{45}$ | $D_{46}$ | $D_{47}$ | $D_{48}$ |
| $D_{51}$ | $D_{52}$ | $D_{53}$ | $D_{54}$ | $D_{55}$ | $D_{56}$ | $D_{57}$ | $D_{58}$ |
| $D_{61}$ | $D_{62}$ | $D_{63}$ | $D_{64}$ | $D_{65}$ | $D_{66}$ | $D_{67}$ | $D_{68}$ |
| $D_{71}$ | $D_{72}$ | $D_{73}$ | $D_{74}$ | $D_{75}$ | $D_{76}$ | $D_{77}$ | $D_{78}$ |
| $D_{81}$ | $D_{82}$ | $D_{83}$ | $D_{84}$ | $D_{85}$ | $D_{86}$ | $D_{87}$ | $D_{88}$ |
FIG. 11
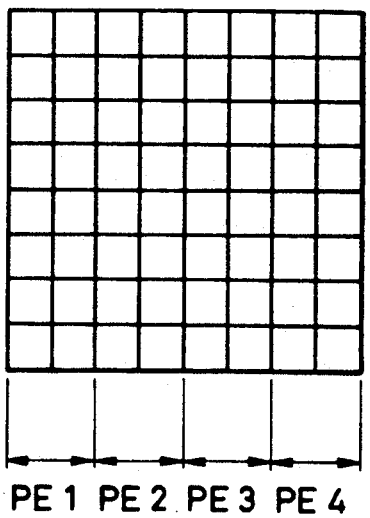
FIG. 12
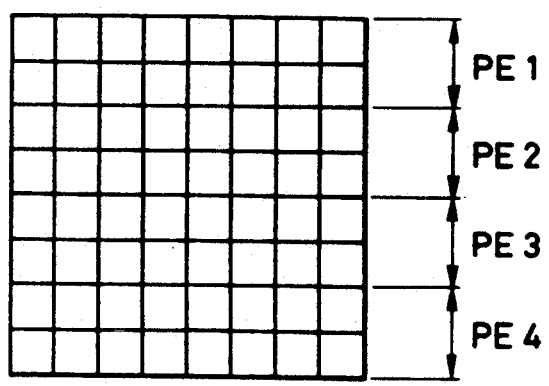

| 16 | 1 |   |
|---|---|---|
| 1 | 1 | 0 |
| 1 | 1 | 0 |
| 2 | 1 | 0 |
| 2 | 1 | 0 |
| 3 | 1 | 0 |
| 3 | 1 | 0 |
| 4 | 1 | 0 |
| 4 | 1 | 0 |
| 1 | 1 | 1 |
| 1 | 1 | 1 |
| 2 | 1 | 1 |
| 2 | 1 | 1 |
| 3 | 1 | 1 |
| 3 | 1 | 1 |
| 4 | 1 | 1 |
| 4 | 1 | 1 |

PE 1

C₂

| 16 | 1 |   |
|---|---|---|
| 1 | 1 | 2 |
| 1 | 1 | 2 |
| 2 | 1 | 2 |
| 2 | 1 | 2 |
| 3 | 1 | 2 |
| 3 | 1 | 2 |
| 4 | 1 | 2 |
| 4 | 1 | 2 |
| 1 | 1 | 3 |
| 1 | 1 | 3 |
| 2 | 1 | 3 |
| 2 | 1 | 3 |
| 3 | 1 | 3 |
| 3 | 1 | 3 |
| 4 | 1 | 3 |
| 4 | 1 | 3 |

```
        RECEIVE    1,  16,  U₁

SEND       C₁,  V₁
           ⋮

L:   TRCV       R1

BNZ        L
           ⋮
```

PARALLEL COMPUTER WITH ASYNCHRONOUS COMMUNICATION FACILITY

BACKGROUND OF THE INVENTION

The present invention relates to a method for preventing the deterioration of performance due to data communication between processors in a parallel computer system.

Among methods of inter-processor data communication in conventional parallel computers, there is one method wherein data sent from other processors are held temporarily in a receive buffer and a receive processor fetches the data when they are needed. As for apparatuses of this kind, an example is shown in Japanese Patent Laid-Open No. 49464/1985. There is no problem in the case when the receive buffer is constructed as FiFO and the number of a send processors is one. However, the send processor which sends data into the receive buffer is provided in a plurality of units, in general. Therefore, the data transferred to the receive buffer are held temporarily as a set of an identification code (ID) plus data, and the receive processor takes in necessary data by checking the ID. Accordingly, the receive buffer is constructed of an associative memory in some cases.

According to the above-described prior art, the receive processor searches the ID on the receive buffer (associative memory) to take in data. Therefore it is necessary to take in separate data sequentially when a plurality of data are needed. Since the data in a plurality are sent from a plurality of send processors generally on the occasion, it is impossible to discern the sequence of arrival of the data at the receive buffer (associative memory). Consequently, it happens in the prior art that the receive processor is forced to wait for the arrival of the data for a time longer than it needs intrinsically.

Let it be assumed, for instance, that the receive processor receives four data of A, B, C and D obtained as the results of computation by other processors and conducts a processing of searching the data out of them that show the maximum value. If the procedure of processings (program) on the receive processor is so prepared that data are taken in the sequence of A, B, C and D from the receive buffer (associative memory), the receive processor can not forward the operation until the data of A arrive at the receive buffer even when other data of B, C and D have already arrived thereat. It is possible to take the data of A, B, C and D in the sequence of their arrival at the receive buffer (associative memory), if IDs of these data are identical. In this case, however, it is impossible to make a distinction between them.

Moreover, data sent from one processor are checked by one receive check instruction, according to the above-stated prior art. Therefore, in such a process as described above wherein all of the arrivals of a plurality of data sent from a plurality of processors must be checked, it is necessary, in some cases, to execute the same number of receive check instructions with that of the units of processors, because the check of data sent from one processor is designed to be conducted by one receive check instruction. Let it be assumed, for instance, that, after data arranged in 8 rows and 8 columns as shown in FIG. 10 are divided in the direction of columns as shown in FIG. 11 and two columns of them are assigned to four processors respectively to be computed in parallel in the direction of columns, it turns necessary to compute the data in parallel in the direction of rows. In this case, the data are allotted to the four processors as shown in FIG. 12. If one unit of data is designed to be sent by the execution of one send instruction according to the above-stated prior art on the occasion, each processor is to execute 12 times of send instructions for three other processors and to execute at least 12 times of receive check instructions. As to the preparation of a program for checking the arrival of data by using the receive check instruction, there is a method, for instance, as described above, wherein the sequence of checking of reception is fixed and the checking of subsequent data is conducted after the arrival of data to be checked first is checked. In the case when there is a difference in the progress of processing between processors on the sending side, however, the sequence of checking is not always in accord with the sequence of arrival, and in the worst case, the arrival of the data to be checked first may be the last. Since the check of the data having arrived already is to be conducted after the data arriving last are checked, in this case, a time required for checking the arrival of all the data is prolonged by a waiting time, and also this involves an increase in the scale of hardware, because a receive buffer wherein received data are stored temporarily is required to hold all the data to be checked. If a program is prepared, to avoid these disadvantages, so that the arrivals of data be checked in their sequence by using also the above-mentioned receive check instructions, the control of the data having been checked and those not having been checked out of arriving data in a plurality must be conducted by the program. Although the checking of the arrival of data can be conducted in a desirable sequence according to this method, the processing of instructions for checking is complicated, and this makes it hard consequently to perform the processing of checking of reception at high speed.

Problems caused by the two methods of programming described above become conspicuous by degrees as the number of processors held by a parallel computer increases and as the speed of inter-processor data transfer is made high to improve the performance of the parallel computer, which results in a shortcoming such that it is impossible to make the most of the merits of the parallel computer.

Summary of the Invention

Regarding a receive processor receiving data in the data communication between processors, the present invention is aimed (1) to make it possible to take data into a receive processor with distinction in the sequence of their arrival at a receive buffer (associative memory);

(2) to take the data sent from other processors into a memory in parallel with computation and check efficiently whether the data sent from other processors have arrived already or not; and thereby to reduce the overhead of processings relating to inter-processor data communication which occurs inevitably when a program for sequential execution is rewritten to be used for a parallel computer, thus making the parallel computer operate efficiently.

The object (1) stated above is attained by a method wherein ID data held temporarily with data in a receive buffer (associative memory) in a processor on the reception side in an inter-processor data transfer is divided into main ID MK and sub ID SK. The part of main ID MK is used for searching data from the receive buffer, the part of sub ID SK and the data are taken in the receive processor, and sub ID SK is used as the identification code in the receive processor.

An idle time of the receive processor can be minimized by the method wherein the data necessitated for processing in the receive processor are taken sequentially, together with sub ID SK, out of those having arrived at the receive buffer (associative memory) by using main ID MK, for instance.

In addition, since the necessary length of sub ID for identifying the data in the receive processor is determined by the number of data, the length of main ID MK and sub ID SK can be changed freely by realizing an associative memory which makes it possible to conduct a search with an arbitrary search length.

Furthermore, the object (2) stated above is attained by a method wherein a group of received data, such as a row of data in a two-dimensional matrix, for instance, which are relevant mutually in terms of the execution of a program in a processor on the reception side in the inter-processor data transfer, is made transferable to a memory in the sequence of the arrival of the data independently from the execution of instructions by the processor, irrespective of whether a send processor of separate data is identical or not. For instance, this object is attained by checking whether an entire group of data relevant mutually has arrived or not, on the basis of the number of times of transfer of these data to said memory.

The number of times of execution of instructions for transferring the data can be lessened by writing in the memory the data having arrived at the processor, independently from the execution of instructions by the processor. Moreover, by checking the completion of reception of a plurality of data on the basis of the number of received data, the number of execution of instructions necessary for checking the reception can be made smaller than that in the case of employment of instructions whereby the reception of data is checked for each data.

BRIEF DESCRIPTION OF THE DRAWINGS

FIG. 10 shows one example of data in a two-dimensional matrix to be subjected to transfer processing;

FIG. 11 shows which columns of the data of FIG. 10 are allotted to four processor elements (PE1 to PE4) before subjected to the transfer processing;

FIG. 12 shows parts of the data to be held in the four processor elements after the data of FIG. 10 are subjected to the transfer processing;

FIG. 15 shows message control vectors ($C_1$, $C_2$) employed by first and second processor elements (PE1, PE2); and FIG. 16 shows an example of a program executed by the first processor element.

EMBODIMENTS

Figure 1:
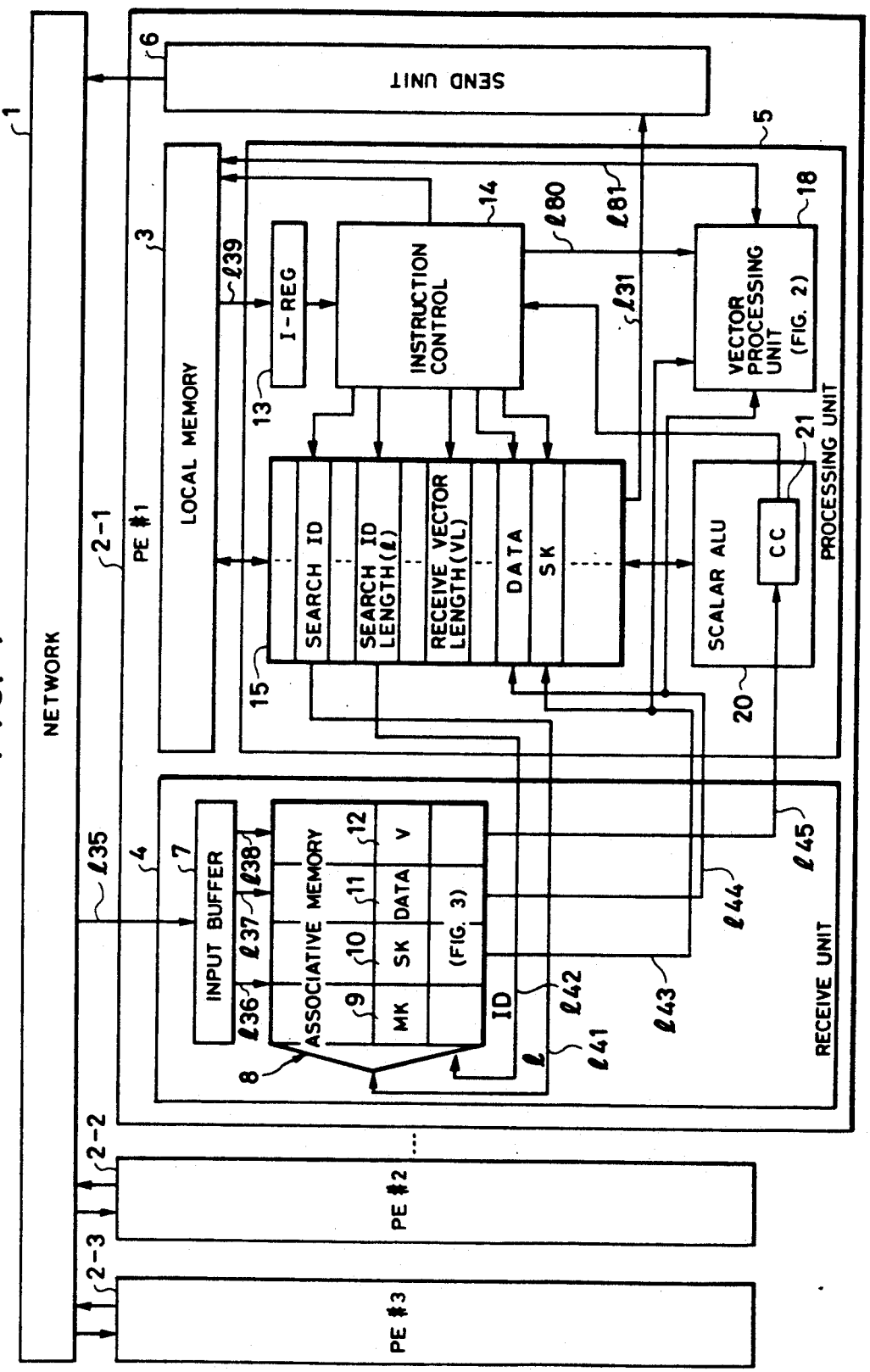
FIG. 1 illustrates a construction of a parallel computer representing a first embodiment of the present invention.

A first embodiment of the present invention will be described hereunder in detail with reference to the drawings. FIG. 1 illustrates an entire construction of a parallel computer representing the first embodiment of the present invention.

In FIG. 1, numeral 1 denotes a network provided between processor elements, and 2-1 to 2-3 processor elements (hereinafter abbreviated as PE). The internal construction of PEs is identical. Numeral 3 denotes a memory in a PE, 6 a send unit which composes a message of an address of a PE to receive data, the data to be sent and IDs allotted thereto and sends the message to the network 1, 5 a processing unit, 4 a data receiving unit which holds received data temporarily and sends the data to the processing unit 5 in response to the request from the processing unit 5, 8 an associative memory which holds the received data temporarily, 13 an instruction register, 14 an instruction execution control unit, 15 a general purpose register group, 18 a vector processing unit, and 20 scalar ALU.

The instruction execution control unit 14 reads instructions sequentially from the memory 3 into the instruction register 13 and controls the execution of instructions read out. The unit 14 supplies a specified register number to a register of the general purpose register group 15 when the number is specified by the read instruction, or controls the processing units 18 and 20 so that they execute processings specified by the read instruction. The vector processing unit 18 consists of vector ALU 71 and a vector register group 70 as shown in detail in FIG. 2.

Although PEs shown in FIG. 1 are only three, other cases of their numbers are contained, of course, in the present invention. The inter-PE network 1 transmits a message to PE having the addressed PE number contained in the message sent from PE. This inter-PE network 1 may be constructed of any of various devices, such as a crossbar switch, a multistage switch network and a bus.

Now, a description will be made on a data transfer procedure between PEs.

First, a send processing will be described. An instruction of requesting the sending of a message is called a send instruction. The format of this instruction is as follows:

SEND GR1, GR2, GR3 where SEND is an operation code and GR1 to GR3 are the numbers of general purpose registers which hold the data to be sent, IDs (MK, SK) for the data to be sent and the number of PE to be addressed, respectively.

When this instruction is set in the instruction register 13, the instruction control unit 14 reads out the contents of these three general purpose registers and sends them to the send unit through a line 131.

The send unit 6 combines the data, IDs and the addressed PE number, which are supplied, to form a message, and sends it to the network 1. The network sends the data and IDs to PE having the addressed PE number contained in the message. The operation described above is identical substantially with that described in Japanese Patent Application No. 61-182361 filed Aug. 1, 1986 (U.S. Ser. No. 078,656, field July 28, 1987). The feature of the present invention lies in that an identification code for the data to be sent is composed of main ID MK representing a data group to which the data belong and sub ID SK for discriminating the data from other data in said data group. When the data to be sent is one element in some vector data, for instance, ID allotted to the vector data is used as main ID, while the number of the element is used as sub ID.

When the addressed PE number in a message on the network 1 is PE 2-1, ID and data in the message are sent to PE 2-1 and taken in the associative memory 8 through the input buffer 7.

Each entry of the associative memory 8 comprises four fields holding main ID MK, sub ID SK, data and an effective bit V which shows that the entry is effective, and the associative memory 8 sets the effective bit V of one entry thereof at 1 when IDs MK and SK and data received afresh are written in the entry. In this way, the transmission of one message from one PE to another is completed.

Next, a description will be made on reading of data from the associative memory 8 in each PE.

An instruction of requesting this reading is called a receive instruction. Besides, the data read by the execution of this instruction is called received data in the following. Several receive instructions are used in the present embodiment. The format of one instruction out of them is as follows:

RECEIVE GR1, GR2, GR3 where RECEIVE denotes an operation code and GR1, GR2 and GR3 denote the number of a general purpose register wherein received data are stored, the number of a general register which holds ID used for search, and the number of a general purpose register which holds the length of a part of said ID to be used for search at present (search ID length), respectively. Since main ID MK is used for search in the present embodiment, the length of this main ID MK Is used as the search ID length. Sub ID SK annexed to the received data is stored in a general purpose register having the number of GR1+1.

When the receive instruction from the memory 3 is set in the instruction register 13, the associative memory 8 is started by the instruction control unit 14. Simultaneously, the search ID length and search ID in the two general purpose registers GR2 and GR3 specified by the receive instruction are sent to the associative memory 8 through a line 141 and a line 142 respectively. The associative memory 8 searches for an entry having main ID which accords with the part of the search ID length of inputted search ID, i.e. the part of main ID in the present embodiment. When main ID MK according therewith is found, sub ID SK and data corresponding thereto are sent to the processing unit 5 through a line 143 and a line 144 respectively. At the same time, a signal ("1") signifying that target data are found is set in a condition code register (CC) 21 in the scalar ALU 21 through a line 145. Moreover, the effective bit V annexed to said data is set at 0. If the target data are not found, in other words, if the data have not yet arrived at the associative memory 8, a signal ("0") signifying that the data are not found is set in the same register 21 through the line 145.

In the processing unit 5, sub ID SK and the data read out are written in the general purpose registers of the numbers (GR1+1) and GR1 respectively in compliance with the receive instruction 14. In this way, the execution of one receive instruction is completed. After the completion of the execution of this receive instruction, the instruction control unit 14 reads out of the memory 3 a well-known branch-on-condition instruction for determining whether or not data prepared for a subsequent instruction has been received successfully, and executes this instruction. When the content of the condition code register 21 is found to be 0 by this instruction, branching is made to the aforesaid receive instruction. If the content of the condition code register 21 is 1, an instruction string subsequent to this branch-on-condition instruction is read out of the memory 3 and executed. This instruction string is the one for applying an operation to the received data. This instruction string is used, for instance, in the case of searching the data having the same main ID with that specified by search ID, i.e. the data having the maximum value in the same data group. It is for using sub ID as the number of the data of the maximum value that the sub ID is received with the data when the receive instruction is executed. The following is a brief description on a scalar instruction string for searching this maximum value. One general purpose register (given the number of GR4) in the general purpose register group 15 is assigned for storage of the maximum value, and another general purpose register (given the number of GR5) therein for storage of sub ID of the data having the maximum value. Both of the initial values of these general purpose registers are set at 0. As a subsequent instruction string of the receive instruction and the branch-on-condition instruction, an instruction string is employed which executes a processing of executing the comparison between received data in the general purpose register numbered with GR1 and data in the general purpose register numbered with GR4 by means of scalar ALU 20 and storing the larger data in the general purpose register numbered GR4, and a processing of selecting either of sub ID for received data stored in the general purpose register numbered with (GR1+1) and sub ID stored in the general purpose register numbered with GR5 on the basis of the result of said comparison and storing the selected sub ID in the general purpose register numbered with GR5.

After the execution of this instruction string, the total numbers of the received data are counted, and a branch-on-count-register instruction is executed for branching on the basis of whether the count numbers reach a predetermined vector length or not. In more detail, a necessary receive vector length is memorized beforehand in a general purpose register numbered with GR6, the vector length is counted down by 1 at the time of execution of said instruction, and when the value of the length counted down by 1 is not 0, jumping is made to an instruction of an address having been memorized in some general purpose register specified by the aforesaid instruction. By using this address as the address of the aforesaid receive instruction, the receive instruction is executed again when the receive vector length does not reach the predetermined necessary receive vector length.

According to the above-described receive instruction, in this way, a plurality of data having main ID specified by search ID can be read out of the associative memory 8 irrespective of the value of sub ID, and an operation for the data read by the receive instruction can be executed in the processing unit 8 while subsequent data are sent out from the network to the associative memory 8. Thus, in the present embodiment, the data in the same group can be read out of the associative memory and processed irrespective of a difference in sub ID between them.

Another receive instruction employed in the present embodiment has the following format.

RECEIVE VR1, GR2, GR3

In this format, GR2 and GR3 denote search ID and a search ID length which shows the length of the part of search ID used for search, like the instruction described previously. VR1 denotes the number of a vector register which stores the data received in compliance with this receive instruction. In other words, this instruction is given for requesting to read from the associative memory 8 the data to which main ID according with search ID is annexed and to store same in the vector register of the number VR1 specified by this instruction. Sub ID annexed to the data read out of the associative memory 8 is used, on the occasion, for specifying the position of storage of the data in the vector register. The following is a description on the operations of devices at the time of the execution of this instruction.

Figure 2:
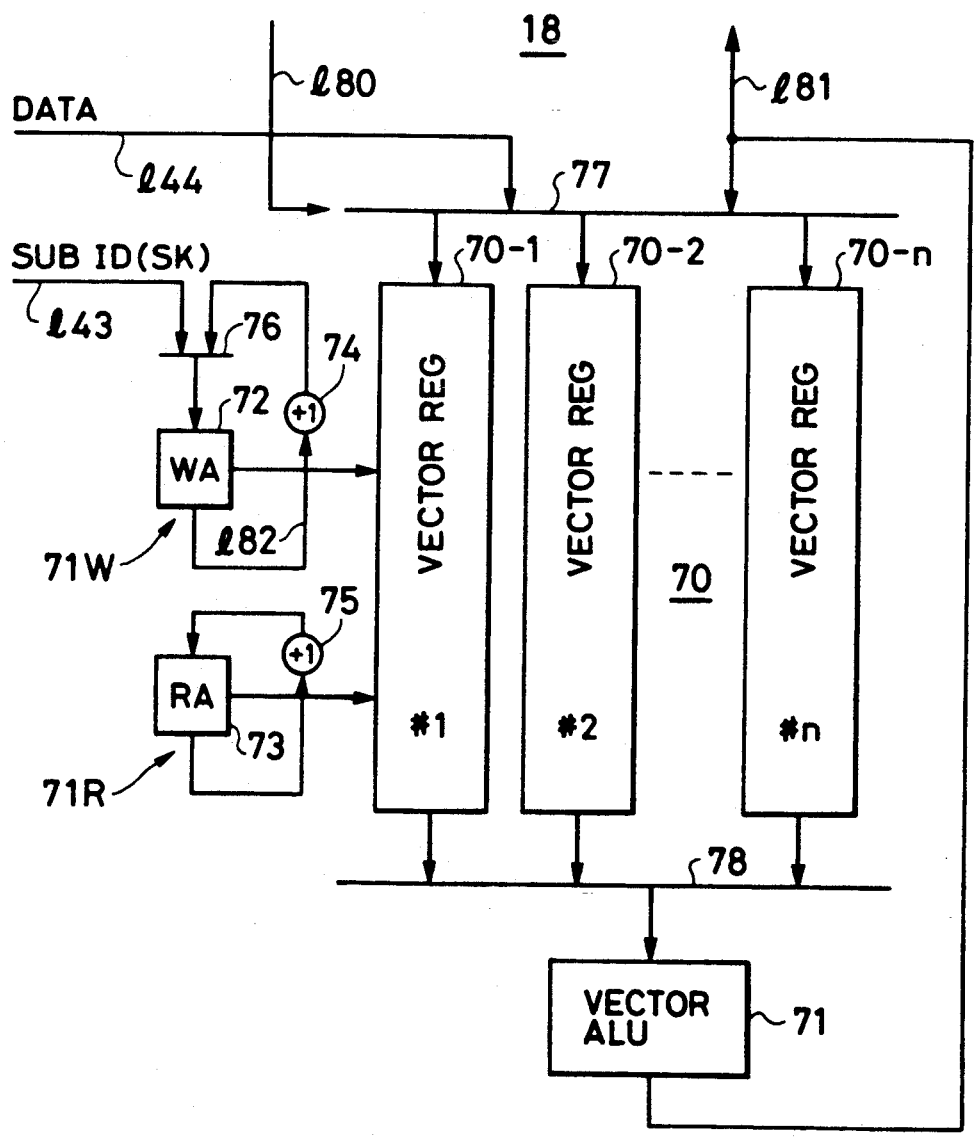
FIG. 2 illustrates a detailed construction of a vector processing unit of FIG. 1.

When this instruction is stored in the instruction register 13, the instruction control unit 14 sends out the vector register number VR1 specified by the instruction to the vector processing unit 18 through a line 80, while sending out search ID and a search ID length from the general purpose register group 15 to the associative memory 8. When the data having main ID MK according with search ID are read therefrom, said data and sub ID SK annexed thereto are sent out to the vector processing unit 18 through the lines 144 and 143 respectively. When FIG. 2 is referred to, the vector processing unit 18 comprises a vector register group 70, vector ALU 71, a selector 77 for selecting a vector register in which vector data supplied from the memory 3 (FIG. 1), the vector ALU 71 or the associative memory 8 are to be written, a selector 78 for selecting a vector register wherefrom vector data are to be supplied to vector ALU 71, and a write circuit 71W and a read circuit 71R which are provided for each vector register. FIG. 2 shows only the write circuit 71W and the read circuit 71R provided for a vector register 70-1. The write circuit 71W comprises a WA register 72 holding a write address, a +1 count-up circuit 74 and a selector 76 which selects an input from the line 143 or an output of the circuit 74 and supplies same to the WA register 72. The read circuit 71R comprises an RA register 73 holding a read address and a +1 count-up circuit 75 which increments a value of the RA register by +1.

When the above-described receive instruction is executed, the vector register number VR1 specified by this instruction is inputted from the instruction execution control unit 13 (FIG. 1) to the selector 77 through the line 80, and the data read out onto the line 144 from the associative memory 8 (FIG. 1) are sent to the vector register numbered with VR1. Now, the vector register 70-1 is assumed to be the vector register of the number VR1 specified by said receive instruction. At this time, the write circuit 71W annexed to the vector register 70-1 is started by the instruction control unit 14, and the selector 76 selects the input from the line 143. As the result, sub ID SK outputted from the associative memory 8 onto the line 143 is set in the WA register 72, while the data supplied from the line 144 are written in a memory corresponding to sub ID SK in the vector register 70-1. As is seen from the above description, received data (vector element) can be written in one vector register by using as main ID a number allotted to vector data and by using as sub ID a number allotted to each element in the vector data.

On the occasion of the execution of the above-described receive instruction, the presence or absence of the data having corresponding main ID is reflected in the condition code register 21 (FIG. 1) in the same way as in the case of the receive instruction described first. In the same way as in this case as well, the branch-on-condition instruction is executed subsequently to the aforesaid receive instruction so as to determine the value in said register, and this receive instruction is executed again when the data fail to be received.

Moreover, after said receive instruction is executed, it is executed by the necessary number of times by using the same branch-on-count instruction as mentioned previously so as to determine whether vector elements in necessary numbers are received.

In this way, the necessary number of vector elements can be stored in one vector register. The processing of the received vector data can be executed thereafter by executing a vector operation instruction, an instruction for storing the vector data in the memory 3 (FIG. 1) or an instruction for loading the vector data reversely from the memory 3.

Besides, modification can be made for execution of other receive instructions in addition to the above-described two receive instructions. For instance, modification can be made so that received data be stored in a register (e.g. a floating-point register, not shown in the figure) other than the general purpose register or the vector register.

Figure 3:
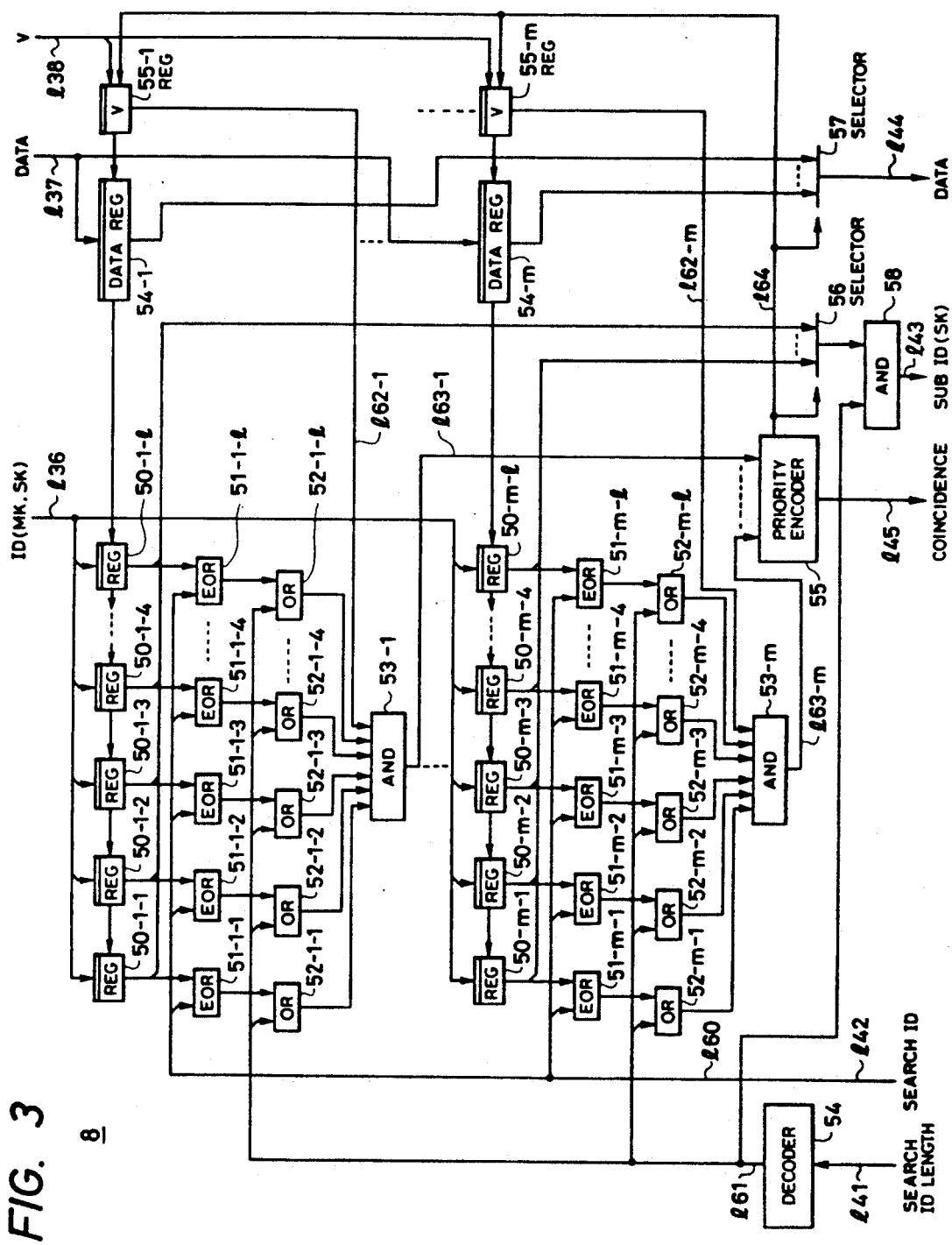
FIG. 3 illustrates a detailed construction of an associative memory of FIG. 1.

FIG. 3 illustrates a detailed construction of the associative memory 8. In the figure, 50-1-1 to 50-1-l and 50-m-1 to 50-m-; denote registers for holding data IDs (of l bits in the present embodiment), 54-1 to 54-m registers for holding data, 55-1 to 55-m registers for holding an effective bit V showing the effectiveness of data, and 56 and 57 selectors.

On the associative memory 8, ID, data and the effective bit V are held in a set.

ID and data are taken out of a message sent from the network 1 (FIG. 1) and are sent into a register 50-i-1 to 50-i-l and a register 54-i corresponding thereto through lines 136 and 137. Mark i denotes a numeral from 1 to m, and it is selected from the ones wherein corresponding effective bit V shows 0. Search ID shown by a receive instruction decoded by the processing unit 5 (FIG. 1) is inputted to 51-1-1 to 51-1-l and 51-m-1 to 51-m-l through a line 42. Moreover, a search ID length shown by the same receive instruction is sent into an ID length decode circuit 54 through a line 41. In the ID length decode circuit 54, the search ID length is decoded, and when the search ID length is S bits, S bits from the left are made to be 0, while the remaining (l−s) bits are made to be 1. These bits are inputted to an OR circuit 52-1-1 to 52-1-l and an OR circuit 52-m-1 to 52-m-l.

Accordingly, search is made by using the part of ID corresponding to the search ID length. Effective bit registers V 55-1 and 55-m showing the effectiveness of data are also checked, of course, and the results of checking are inputted to an AND circuit 53-1 and an AND circuit 53-m through a line 162 and a line 162-m respectively.

The results of search are sent to a priority encoder 55 through a line 163-1 and a line 163-m. The priority encoder 55 selects one of main IDs of which the coincidence is detected, and switches over the selector 56 and the selector 57 on the basis of the result of selection. Besides, the effective bit for the data having coincident main ID is reset by a signal found on a line 164. From the priority encoder 55, whether or not the data having the part of ID coincident in the specified length are found is sent to the condition code register 22 (FIG. 1) through the line 145. Moreover, the logical sum of an output from the selector 56 and an output through a line 161 is taken for every bit, and the selected ID SK is sent to the processing unit 5 (FIG. 1) through the line 143, while the data are sent thereto from the selector 57.

As is apparent from the above, the feature of the present embodiment lies in that a plurality of data belonging to a data group can be taken out of the associative memory by using ID (main ID MK) annexed to each group. For this purpose, accordingly, the present invention can be applied also to the case when sub ID is not given to data. Moreover, it is not necessary to supply the search ID length from the processing unit 5 to the associative memory 8 on condition that the length of main ID MK is fixed. In the case when the length of ID is specified, as in the present embodiment, the same associative memory can be used even when the length of ID is varied. Moreover, the present invention is advantageous also in that any data having IDs coincident in terms of both main ID and sub ID can be searched for on the same memory on condition that the search ID length is made to be the sum of the lengths of said two IDs.

A second embodiment of the present invention will be described hereunder with reference to the drawings.

In the present embodiment, as in the first embodiment, main ID representing a specified data group to which data to be sent belong and sub ID for discriminating the data from other data in said data group are used as IDs annexed to data, and the data having the same main ID are searched for when data are read from the associative memory.

However, while one data are sent to another processor element by one send instruction and one data are read from the associative memory by one receive instruction in the first embodiment, a group of data are sent to another group of processor elements by one send instruction and a plurality of data are read from the associative memory by one receive instruction in the present embodiment. The details of these processes will be described in the following.

Figure 4:
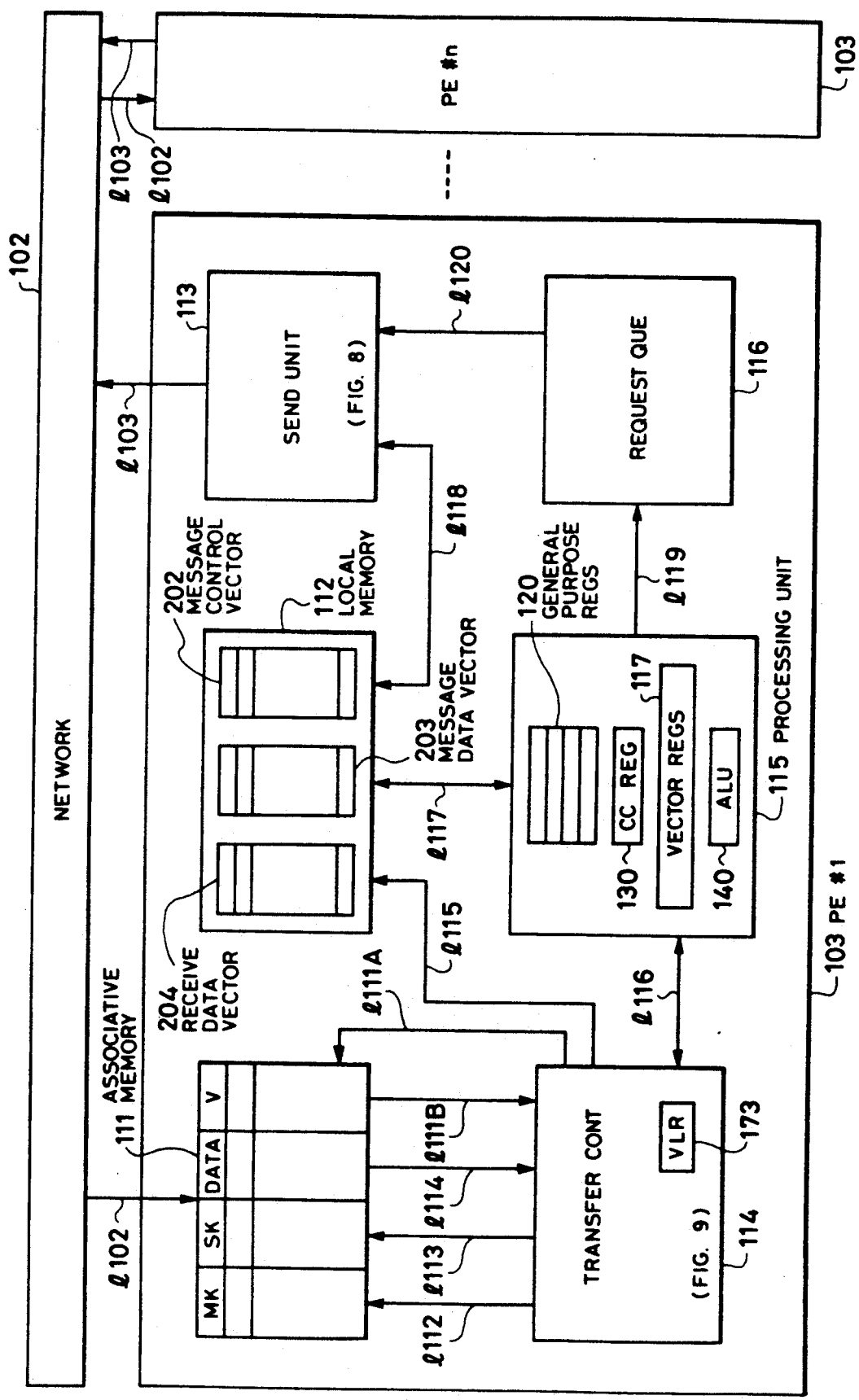
FIG. 4 illustrates an entire construction of a parallel computer representing a second embodiment of the present invention.

In FIG. 4, numeral 102 denotes a network, 103 a processor element, and a plurality of processor elements 103 are connected mutually so that they interchange messages through the network 102.

Figure 5:
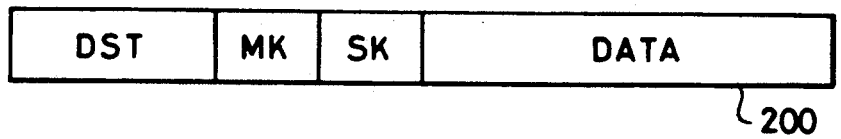
FIG. 5 illustrates a type of a message.

FIG. 5 illustrates the content of a message 200 to be sent. DST represents the number of a processor element to which the message is sent, and MK and SK in this message represent IDs for identifying data. MK denotes main ID for identifying a data group to which the data in the message belong, and SK denotes sub ID for identifying the data as an element in said data group. Main ID represents, for instance, the number allotted to each vector data, while sub ID represents the number of 0, 1, . . . or n of each element in said vector data. In the second embodiment, MK and SK are assumed to have fixed lengths respectively, for simplification, but they can have variable lengths also as shown in the first embodiment. In FIG. 4, numeral 111 denotes an associative memory for storing temporarily a message sent from the network 102 through a line 1102, and in one entry thereof, IDs MK and SK and DATA of one received message 200 (FIG. 5) and an effective bit V showing the effectiveness of the entry are held. For simplification, the content of one entry of the associative memory 111 will be called a message or a received message hereunder. The associative memory 111 is so constructed as to conduct associative search by means of inputted main ID MK and deliver sub ID SK and data of a coincident message. Numeral 112 denotes a local memory which is given addresses in bytes. 115 denotes a processing unit, which executes sequentially an instruction string set in the local memory 112. This unit, like that shown in FIG. 1, has a general purpose register group 120, a condition code register 130, a vector register group 117 and ALU 140 conducting a vector operation or a scalar operation, in addition to an instruction execution control unit (not shown in the figure). 114 denotes a transfer controller, which receives main ID MK for search, a vector length VL and a local memory address U from the processing unit 115, makes the associative memory 111 conduct the associative search until a vector element in the number equal to the vector length VL is read out of the associative memory 111, and writes in the local memory 112 the vector element obtained as the result of the search, through a line 1115. Numeral 116 denotes a request que, which is a buffer for storing temporarily a message send request given from a processor element 103 to another processor element 103, and it operates on the FIFO basis. 113 denotes a send unit, which receives from the request que 116 the message send request outputted therefrom on the FIFO basis, through a line 1120, reads from a line 1118 the message set beforehand on the local memory 112, gives it the number of an addressed processor element, and sends it onto the network 102 through a line 1103.

Next, a description will be made on an operation of communication between processor elements and the operation of the send unit 113. The processing unit 115 of the present invention executes ordinary instructions such as an arithmetic operation instruction, a data transfer instruction and a branch instruction, as well as peculiar instructions. The peculiar instructions, related to the communication between processor elements, include a send request instruction (hereinafter mentioned as SEND instruction) for requesting the sending of a message, a receive start instruction (hereinafter mentioned as RECEIVE instruction) for starting the processing of receiving the message, and an instruction (hereinafter mentioned as TEST RECEIVE instruction) for instructing the check of completion of the receive processing of the message.

The SEND instruction has the following specification.

SEND C, V

Figure 6:
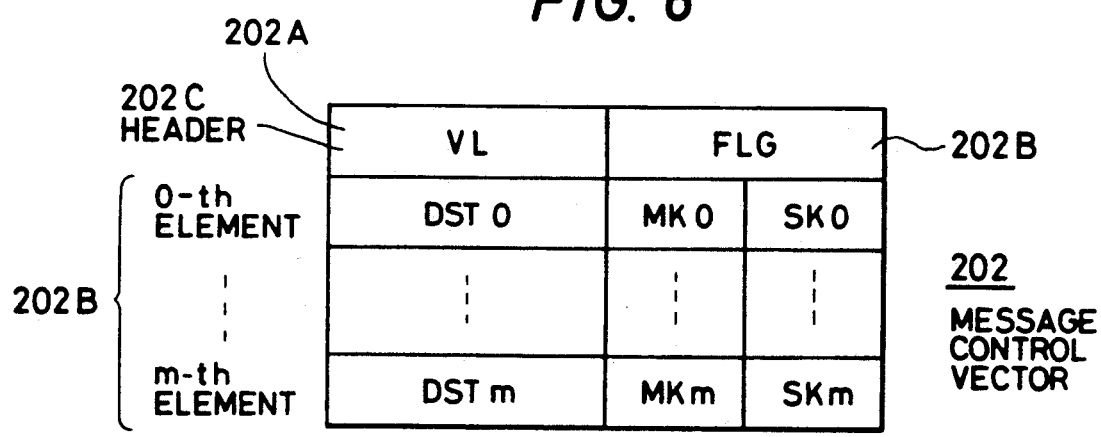
FIG. 6 illustrates data in a message control vector (202)
Figure 7:
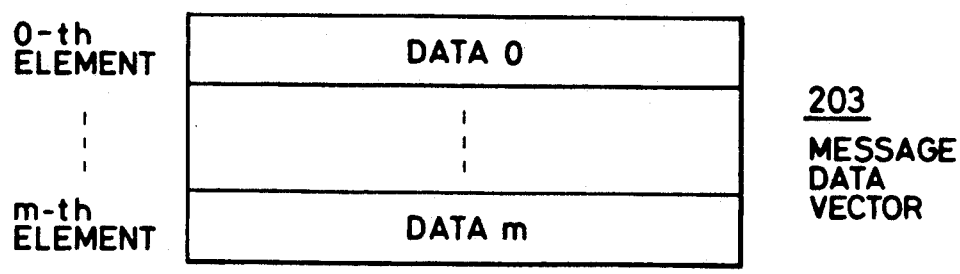
FIG. 7 illustrates data in a message data vector (203)

Herein SEND represents the operation code of the SEND instruction. On the local memory 112, the vector data 203 (FIG. 4, hereinafter called a message data vector) to be sent, and the message control vector 202 (FIG. 4) composed of signals related to the sending of said vector data 203, are stored beforehand. The first operand C of the SEND instruction is the head address of the message control vector 202, and the message control vector data 202 comprises a header 202A composed of a VL field 202A and an FLG field 202B, and a plurality of message control fields 202B subsequent to the header, as shown in FIG. 6. The VL field 202A holds the number of the message control fields 202B, i.e. a vector length VL, while the FLG field 202B holds a flag FLG signifying the completion of a send processing of data. Prior to the execution of the SEND instruction, FLG is initialized at a value other than 0. Each element of the message control field 202B is composed of signals DSTj, MKj and Skj, which represent the number of an addressed processor element and main ID and sub ID allotted to each vector element of the message data vector 203 respectively. The other operand V of the SEND instruction is the head address of the message data vector 203, and each element of the message data vector 203 is composed of a plurality of data of fixed length as shown in FIG. 7. When executing the SEND instruction, the processing unit 115 delivers C and V, the operands of this instruction, to the request que 116 through a line 1119 of FIG. 4, and executes a subsequent instruction.

Figure 8:
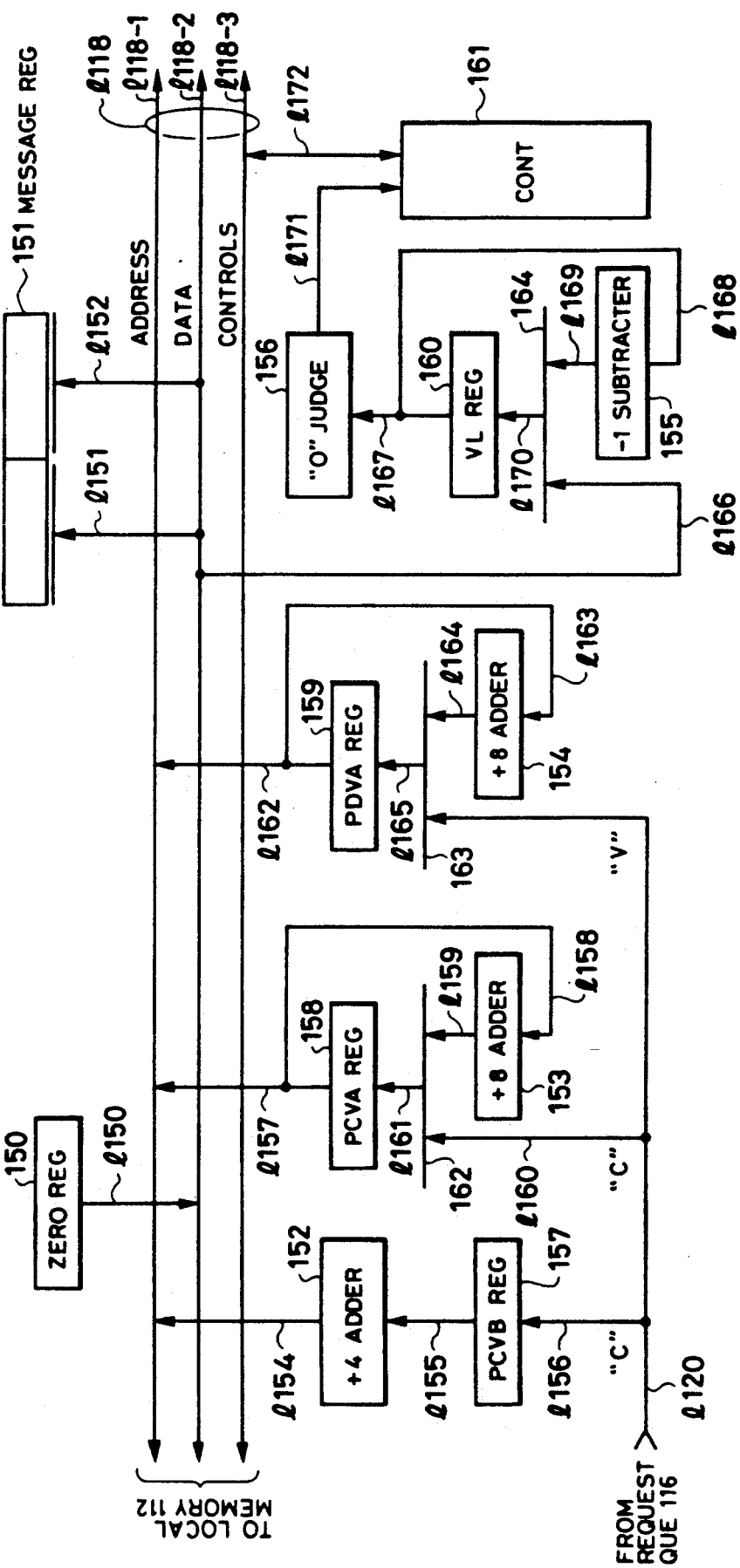
FIG. 8 illustrates a construction of a send unit (113) of FIG. 4.
Figure 9:
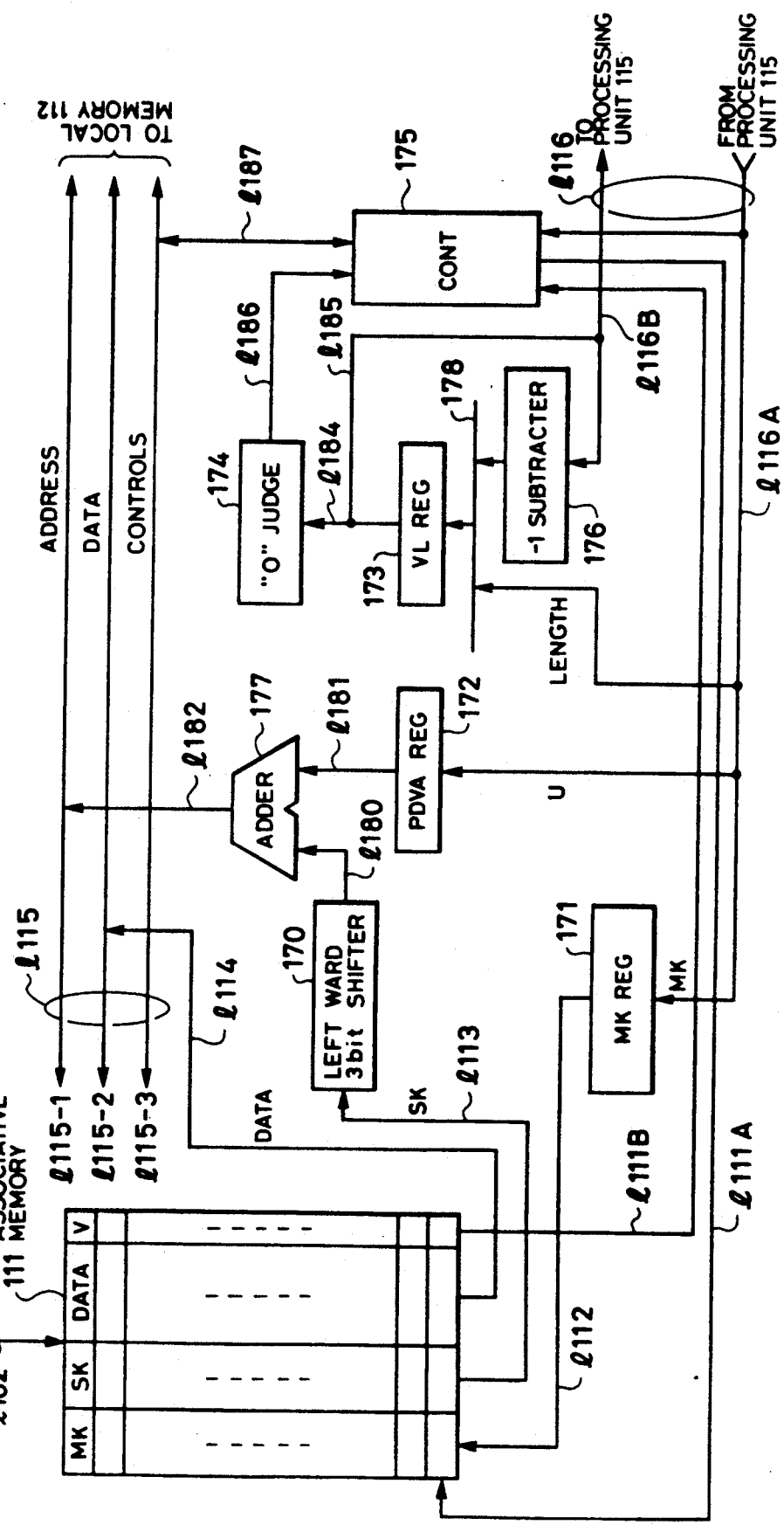
FIG. 9 illustrates a construction of a transfer controller (114) of FIG. 4.

FIG. 8 illustrates a construction of the send unit 113. The operation of the send unit 113 is performed in the following way under the control of a control circuit 161.

(1) The operands C and V of the SEND instruction are taken thereby out of the request que 116 through a line 1120, and the operand C is given to a PCVB register 157 through a line 1156 and to a PCVA register 158 through a line 1160, a selector 162 and a line 1161, while the operand V is given to a PDVA register 159 through the line 1120, a selector 163 and a line 1165. If the request que 116 is unloaded, waiting is made until it is loaded, and then the above-stated operation is performed.

(2) With the operand C in the PCVA register 158 used as an address, the local memory 112 is accessed through a line 1118, the vector length VL of the message control vector 202 is read therefrom and given to a VL register 160 through a line 1166, a selector 164 and a line 1170.

(3) The vector length VL in the VL register 160 is inputted to a "0" judge circuit 156 through a line 1167. When the value is 0, an advance is made to a step (7).

(a) The content of the PCVA register 158 is incremented by 8 through a line 1158, a +8 adder circuit 153, a line 1159, the selector 162 and the line 1161.

(b) With the content of the PCVA register 158 used as an address, subsequently, the memory 112 is accessed through a line 1118, and the subsequent elements (DST0, MK0 and SK0 in the present case) of the message control vector 202 (FIG. 7) are read out therefrom and given to the upper 8 bits of a message register 151. Thereafter the above-stated processing (a) is performed.

(4) With the operand V in the PDVA register 159 used as an address, a 0-th element of the message data vector 203 (FIG. 8) is read out and given to the lower 8 bits of the message register 151. Besides, the content of the PDVA register 159 is incremented by 8 by a +8 adder circuit 154.

(5) The message of the type of FIG. 5 is formed in the message register 151 by the steps (3) and (4), and it is given to the network 105 through a line 1103. Moreover, the content of the VL register 160 is subtracted by a −1 subtracter circuit 155.

(6) When the content of the VL register 160 is judged to be 0 by the "0" judge circuit 156 after the above-stated processings are executed, an advance is made to the next step (7). If not so, a return is made to the step (3). In other words, the advance to the next step (7) is made after the vector element is sent out by a vector length specified by the SEND instruction.

(7) A value obtained by incrementing the content of the PCVB register 157 by 4 by means of a +4 adder circuit 152 being used as an address, the local memory 112 is accessed through the line 118, and the content of a ZERO register 150 wherein the value 0 is always stored is written in the FLG field of the message control vector 202, so as to 0-clear this field.

In the way described above, the vector data are sent from some processor element.

Next, a description will be made on a RECEIVE instruction. The RECEIVE instruction has the following specification.

RECEIVE, MK, LENGTH, U

Herein RECEIVE represents an operation code of the RECEIVE instruction, MK main ID allotted to vector data to be received, LENGTH the number of vector elements to be received, and U the head address of the area 204 (FIG. 4) of the local memory 112 wherein the received vector data are to be stored. When executing the RECEIVE instruction, the processing unit 115 delivers MK, LENGTH and U, the operands of this instruction, to the transfer controller 114 through the line 1116, so as to start the transfer controller 114 to commence the execution of a subsequent instruction.

Next, a description will be made on the construction and operation of the transfer controller 114. FIG. 10 illustrates the construction of the transfer controller 114 and also the associative memory 111. The operation of the transfer controller 114 is performed in the following way under the control of a control circuit 175.

(1) The operands MK, LENGTH and U of the RECEIVE instruction given from the processing unit 115 through a line 1116A are set in an MK register 171, a VL register 173 and a PDVA register 172 respectively.

(2) The control circuit 175 starts the associative memory 111 through a line 1111A. The associative memory 111 searches for one message having main ID MK coincident with the content MK of the MK register 171 given through a line 1112, out of a group of messages stored temporarily therein. If this message is found out, the sub ID SK and data of the message are outputted onto a line 1113 and a line 1114 respectively, the detection of the coincident message is made known to the control circuit 175 by setting the value of a line 1111B at 1, and also the message is erased from the associative memory 111. This erasure is accomplished by turning the effective bit V of the message to be 0. When the coincident message is not detected, another message is judged to be the coincident message or not every time when it arrives at the associative memory 111 from the network 2, and if the coincident message is detected, the same operation as described above is performed.

(3) In the transfer controller 114, the sub ID SK outputted onto the line 1113 is shifted by 3 bits leftward by a leftward 3 bit shifter 170, and the head address U in the PDVA register 172 is added to the value obtained by the shifting, by an adder 177, so as to calculate the address of an entry storing an element numbered with said sub ID SK in a message data vector area 204 in the local memory 112 shown by the operand U of the RECEIVE instruction. The output of said adder 177 and the data outputted onto the line 1114 are sent to the memory 112 through an address line 1115-1 and a data line 1115-2 respectively. In response to that the signal on the line 1111B turns to be 1, the control circuit 75 sends a data write instruction to the memory 12 through a line 1187 and a control line (115-3 so as to store said data in said address. Besides, the content of the VL register 173 is subtracted by 1 by a $-1$ subtracter circuit 176.

(4) When the result of this subtraction is not 0, the output of an "0" judge circuit 174 is $-0$, and the control circuit 175 proceeds to the processing of the step (2). In this way, the vector elements are searched one after another out of the associative memory 111 and written in the local memory 112. If the result of said subtraction is 0, the above-stated operation is ended.

As described above, the transfer controller 114, once started by the RECEIVE instruction, makes an access to the associative memory 111 until a coincident message equal to a vector length VL specified by said instruction is read out of this memory 111, and writes the data of the coincident message in the local memory 112.

Next, a description will be made on a TEST RECEIVE instruction. This instruction has the following specification.

TRCV R$_j$

Herein TRCV represents an operation code of this instruction, and R$_j$ the number of one register in the general register group 120 (FIG. 4) provided in the processing unit 115. When executing the TEST RECEIVE instruction, the processing unit 115 reads the content of a VL register 173 out of the transfer controller 114 through a line 1116B and stores the value thereof in a general register numbeted with R$_j$ and specified by this instruction. On the occasion, it judges whether or not the value stored in this general register is 0, and sets 0 in the condition code register 130 (FIG. 4) if the value is 0, while setting 1 therein if the value is not 0. Next, a branch-on-condition instruction for judging this condition code and branching is executed.

Figure 13:
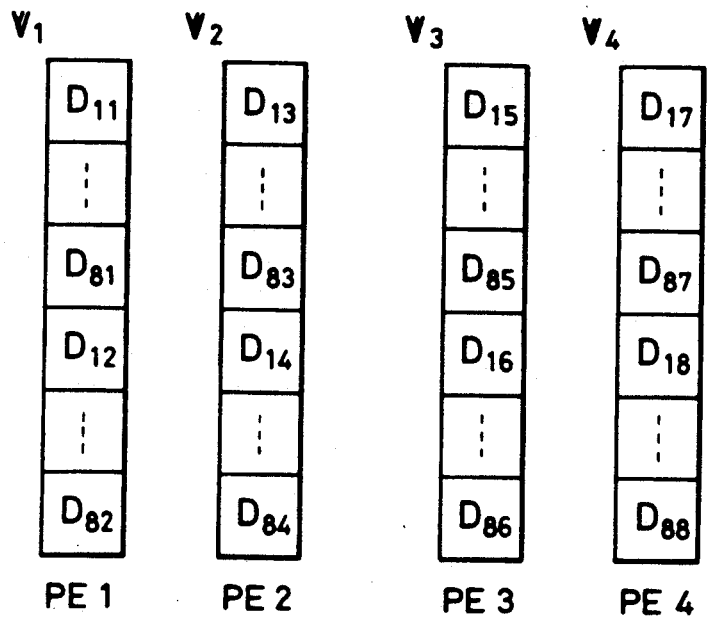
FIG. 13 shows parts of vector data out of the data of FIG. 10 to be held by the four processors before the data are subjected to the transfer processing.
Figure 14:
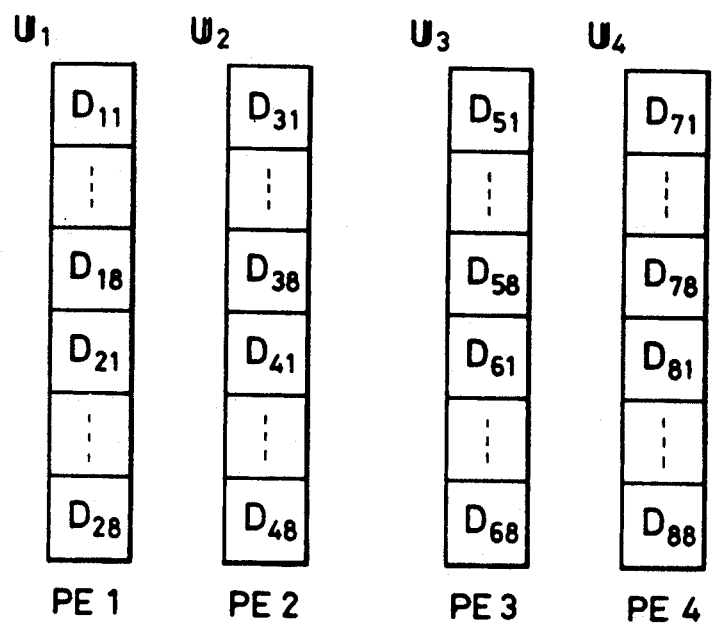
FIG. 14 shows parts of vector data to be held by the four processor elements as the result of the application of the transfer processing to the data of FIG. 10.

Subsequently, a description will be made on a concrete example of the use of a parallel computer of the present embodiment. A description will be made herein on the case when data showing a transposed matrix are obtained from data in a matrix of 8 rows and 8 columns shown in FIG. 10 by using four processor elements PE1 to PE4. FIG. 11 shows that data of two columns different from others in the matrix of FIG. 10 are allotted to each processor element. FIG. 12 shows data to be held by each processor element after an operation of obtaining the transposed matrix to be described hereunder is performed. FIG. 13 shows a part of a vector which each processor element holds on its local memory 15 before a processing of obtaining the transposed matrix is performed. FIG. 14 shows a part of a vector which each processor element is to store on its local memory 112 after a processing of obtaining the data showing the transposed matrix is performed, and FIG. 15 shows message control vectors C$_1$ and C$_2$ which the processor elements PE1 and PE2 out of the processor elements PE1 to PE4 specify as operands when they execute the SEND instruction. FIG. 16 shows an example of a program executed by the processor element PE1. The processor elements PE3 and PE4 are also loaded with the same message control vectors and made to execute the same programs.

When executing the RECEIVE instruction of the program of FIG. 16 and receiving messages whose main IDs have a value of 1, the processor element PE1 stores them in positions in a data vector U$_1$ corresponding to the respective sub IDs of these messages and, by executing the SEND instruction, it forms a message to send them, from the message control vector C$_1$ and a message data vector V$_1$ and sends it to the network 102. In the processor element PE1, the send unit 113 executes the sending of said message, and the transfer controller 114 executes the writing in the aforesaid vector region U$_1$. In the meanwhile, the processing unit 115 in the processor element PE1 can execute other instructions. Thereafter, the TEST RECEIVE instruction is executed to check the arrival of all the data in a transposed matrix. Then, a branch-on-condition instruction BNZ is executed to judge the arrival of all of them by means of a condition code after the execution of the TEST RECEIVE instruction. The TEST RECEIVE instruction is repeated, if necessary.

The above exemplifies the case when a matrix is transposed. Although only the processing of the processor element PE1 is mentioned in the above, other processor elements PE2 to PE4 also execute the same processings to complete the transposition of the matrix.

In the above embodiments, data to be sent to other processors and data sent from other processors are stored in the local memory. In this relation, it is easy to change the storage therefrom to a vector register in the processor. When the vector register is employed for this purpose, it is only needed to specify the number of the vector register instead of specifying the head address of a vector on the local memory.

EFFECT OF THE INVENTION

According to the present invention, it is possible to take in a receive processor the data necessary for a process wherein the rule of interchange is established, in the sequence of their arrival at a receive buffer (associative memory), and thus an idle time of the receive processor can be minimized.

Moreover, according to the present invention, a boundary dividing ID into two parts can be set freely, and thus ID of definite length can be used effectively.

Furthermore, the reception of data from a plurality of processor elements can be checked collectively by one instruction. Besides, the receive processing of data can be started collectively by a receive start instruction, and the sending of data can be started also collectively by a send instruction. Therefore, the transmission and reception of a large number of data can be executed even with a large number of processor elements only by processings of several instructions. This produces an effect that the lowering of the efficiency of parallel processings due to the processings of a number of instructions relevant to the communication of data can be prevented.

We claim:

1. A parallel computer for asynchronous transmission of messages among processors, having:
   (a) a plurality of processors, and
   (b) a network for data transfer between said plurality of processors,
   (c) each processor having;

(c1) first means for sending to said network a message comprising data to be sent to another processor and data ID, the data ID comprising a main ID for identifying a data group to which said data belong and a sub ID for discriminating said data from other data in said data group, (c2) second means for receiving from the network and holding a plurality of messages supplied to the processor from said network, and outputting data and sub ID contained in one communication data having a main ID contained in one communication data having a main ID coincident with a search main ID, among said plurality of held communication data in response to supply of said search main ID to said second means, and, (c3) third means for executing a plurality of instructions, said third means supplying said second means with a search main ID specified by an instruction requesting reading of data out of said second means among the instructions, in response to said instruction.

2. A parallel computer, according to claim 1, wherein said third means has means for supplying said second means with said search main ID repeatedly until a prescribed number of pairs of data and a sub ID are delivered from said second means.

3. A parallel computer, according to claim 2, wherein said means of repeated supply includes means for executing said repeated supply in response to single executions of said instruction.

4. A parallel computer, according to claim 3, wherein said third means has
means for executing instructions subsequent to said instruction in the course of execution of the repeated supply by said means of repeated supply.

5. A parallel computer, according to claim 3, wherein said third means has
means a plurality of vector data, and
means a plurality of data included in said number of pairs delivered from said second means in storage positions specified by sub IDs included in the delivered pairs, within a region in said vector data holding means specified by said instruction.

6. A parallel computer, according to claim 2, wherein said means of repeated supply includes means for executing said repetition by executing same instruction repeatedly.

7. A parallel computer, according to claim 2, wherein said third means includes:
vector data holding means, and
means for writing the data supplied from said second means in a position in said vector data holding means which is determined on the basis of sub ID annexed to said data.

8. A parallel computer, according to claim 7, wherein said vector data holding means comprises a memory which holds instructions executed in each processor and data.

9. A parallel computer, according to claim 8, wherein said third means has an arithmetic or logical operation unit executing a vector operation on vector data held by said vector data holding means.

10. A parallel computer, according to claim 7, wherein said vector data holding means comprises vector registers.

11. A parallel computer according to claim 1, wherein said first means has means responsive to execution of a data send instruction by said third means for forming a plurality of messages each including one of a plurality of data specified by the data send instruction and a main ID specified by the data send instruction in common to said plurality of data and one of sub ID's specified by the data send instruction each for one of the plurality of data, and for delivering the formed messages sequentially to the network.

12. A parallel computer for asynchronous transmission of messages among processors, having:
(a) a plurality of processors, and
(b) a network for data transfer between said plurality of processors, and
(c) each processor having;
(c1) first means for sending to said network a message including communication data comprising data to be sent to another processor and a main ID for identifying a data group to which said data belong,
(c2) a second means for receiving from the network and holding a plurality of communication data included in messages supplied from said network to said processor and for outputting a pair of data contained in one communication data having a main ID coincident with a search main ID, among said plurality of held communication data, in response to supply of said search main ID to said second means, and
(c3) third means for executing a plurality of instructions, said third means including means for supplying said second means repeatedly with a search main ID specified by an instruction of requesting reading of data out of said second means, in response to said instruction, until a prescribed number of data having a same main ID attached as the search main ID are outputted from said second means.

13. A parallel computer, according to claim 12, wherein said repeated supply means comprises means for executing said repeated supply in response to single execution of said instruction.

14. A parallel computer, according to claim 13, wherein said first means has means responsive to execution of a data send instruction by said third means for forming a plurality of messages each including (a) one of a plurality of data specified by the data send instruction and (b) a main ID specified by the data send instruction, and for delivering the formed messages sequentially to the network.

15. A parallel computer, according to claim 12, wherein said repeated supply means comprises means for executing said repetition by executing said instruction repeatedly.

16. A parallel computer, having:
(a) a plurality of processors, and
(b) a network for data transfer between said plurality of processors,
(c) each processor having;
(c1) first means for sending to said network a message including communication data comprising data to be sent to another processor and ID for identifying said data,
(c2) second means for receiving from the network and holding a plurality of communication data included in messages supplied from said network to the each processor, and for outputting data contained in one communication data which includes an ID having a part coincident with part of a search ID, specified by a search ID length, among said plurality of held communication data, in response to supply of the search ID and the search ID length to said second means, wherein the coincident part and the part of the search ID have length equal to the search ID length, and (c3) third means for executing a plurality of instructions, said third means supplying said second means with a search ID and search ID length both specified by an instruction of requesting reading of data out of said second means, in response to said instruction.

17. A parallel computer, according to claim 16, wherein said second means has means for outputting another part of that ID having coincident part, together with said data contained in said one communication data.

18. A system for asynchronous interprocessor communication in a multiprocessor computer, comprising:
a plurality of processor elements;
network for selectively communicating communication data among the processor elements, wherein each communication data includes,
an identification code including a first identification data portion and a second identification data portion, and
an operative data portion for which interprocessor communication is desired;
at least one processor element of the plurality of processor including,
means for appending identification code data and operative data to form communication data,
means for communicating formed communication data to the network,
means for receiving communication data from the network,
associative memory for storing received communication data,
searching means for searching received communication data stored in the associative memory in accordance with the first identification data portion thereof, and
means for selectively processing operative data included in one communication data selected by the searching means in accordance with the second identification data appended thereto.

19. A processor element adapted for asynchronous communication with a plurality of similar processor elements in a multiprocessor computer network, comprising:
means for appending identifcation code data and operative data to form communication data;
means adapted for communicating formed communication data to an associated interprocessor communication network;
means for adapted for receiving communication data from the associated interprocessor communication network;
associative memory for storing received communication data;
searching means for searching received communication data stored in the associative memory in accordance with the first identification data portion thereof; and
means for selectively processing operative data selected by the searching means in accordance with the second identification data appended thereto.

20. A method of asynchronous interprocessor communication in a multiprocessor computer, comprising the steps of:
appending identification code data, including a first identification data portion and a second identification data portion, to operative data for which interprocessor communication is desired to form communication data;
selectively communicating the communication data to an associated interprocessor communication network;
received communication data from the network;
storing received communication data in an associative memory;
searching received communication data stored in the associative memory in accordance with the first identification data portion thereof; and
selectively processing operative data selected by the searching step in accordance with the second identification data appended thereto.

* * * * *

UNITED STATES PATENT AND TRADEMARK OFFICE
CERTIFICATE OF CORRECTION

PATENT NO. : 5,086,498

DATED : February 4, 1992

INVENTOR(S) : Teruo Tanaka, et al.

It is certified that error appears in the above-identified patent and that said Letters Patent is hereby corrected as shown below:

Title Page:

Filed: January 19, 1988

Claim 1, column 15, lines 11-12, delete "contained in one communication data having a main ID".

Claim 20, column 18, line 35, delete "received" and substitute therefor --receiving--.

Signed and Sealed this

Eleventh Day of May, 1993

Attest:

MICHAEL K. KIRK

*Attesting Officer*      *Acting Commissioner of Patents and Trademarks*